(12) United States Patent
Thwaits et al.

(10) Patent No.: US 12,745,332 B2
(45) Date of Patent: Sep. 22, 2026

(54) CONTROL AND MONITORING CIRCUITRY FOR ILLUMINATED INTERFACE

(71) Applicant: Tesla, Inc., Austin, TX (US)

(72) Inventors: Jason Thwaits, Mountain View, CA (US); Joris Aerts, Delft (NL)

(73) Assignee: Tesla, Inc., Austin, TX (US)

( * ) Notice: Subject to any disclaimer, the term of this patent is extended or adjusted under 35 U.S.C. 154(b) by 23 days.

(21) Appl. No.: 18/946,417

(22) Filed: Nov. 13, 2024

(65) Prior Publication Data

US 2026/0136440 A1 May 14, 2026

(51) Int. Cl.
*H05B 45/37* (2020.01)
*H05B 45/325* (2020.01)
*H05B 45/44* (2020.01)
*B60Q 3/70* (2017.01)

(52) U.S. Cl.
CPC ........... *H05B 45/325* (2020.01); *H05B 45/44* (2020.01); *B60Q 3/70* (2017.02)

(58) Field of Classification Search
CPC ........ H05B 45/37; H05B 45/44; H05B 45/46; H05B 45/52; H05B 45/54; H05B 45/325; B60Q 1/2696; B60Q 3/70
See application file for complete search history.

(56) References Cited

U.S. PATENT DOCUMENTS

| | | | | |
|---|---|---|---|---|
| 9,080,352 | B2 | 7/2015 | Aerts et al. | |
| 11,076,461 | B2 * | 7/2021 | Qiu | H05B 39/083 |
| 11,240,895 | B2 * | 2/2022 | Qiu | H05B 45/28 |
| 12,227,972 | B2 | 2/2025 | Aerts et al. | |
| 2009/0135618 | A1 * | 5/2009 | Chang | H05B 45/54 362/464 |
| 2014/0355697 | A1 * | 12/2014 | Magin | H04B 3/542 375/257 |
| 2017/0069606 | A1 * | 3/2017 | Gould | H10W 90/00 |
| 2021/0068238 | A1 * | 3/2021 | Twaddell | H03K 17/962 |
| 2024/0201341 | A1 * | 6/2024 | Siessegger | G01S 7/484 |

* cited by examiner

*Primary Examiner* — Tung X Le
(74) *Attorney, Agent, or Firm* — Knobbe, Martens, Olson & Bear, LLP

(57) ABSTRACT

An illuminated interface system may include an illumination circuit, a switch circuit, and a controller. The illumination circuit is configured to illuminate a light source. The switch circuit is configurable into a plurality of states, where at least one of the plurality of states represents a user input. The controller is electrically connected to the illumination circuit and the switch circuit through a single signal wire. The controller includes a drive circuit and a sensing circuit. The drive circuit is configured to provide a drive signal to the illumination circuit via the single signal wire. The sensing circuit is configured to detect a state of the switch circuit.

18 Claims, 6 Drawing Sheets

CONTROL AND MONITORING CIRCUITRY FOR ILLUMINATED INTERFACE

TECHNICAL FIELD

The present disclosure relates to electronic control systems. More particularly, embodiments of the present disclosure relate to control and monitoring circuits for illuminated interfaces.

BACKGROUND

Illuminated interfaces are used in various applications to enhance user interaction and visibility. For example, illuminated buttons such as window switches and door switches may be deployed in vehicles.

Illuminated buttons can involve multiple wires to control illumination and detect button pushes. For example, one or more wires can be used for controlling illumination and one or more other wires can be used for detecting button pushes.

SUMMARY OF CERTAIN INVENTIVE ASPECTS

The systems, methods and devices of this disclosure each have several innovative embodiments, no single one of which is solely responsible for all of the desirable attributes disclosed herein. Details of one or more implementations of the subject matter described in this specification are set forth in the accompanying drawings and the description below.

In some aspects, the techniques described herein relate to an illuminated interface system including: an illumination circuit configured to illuminate a light source; a switch circuit configurable into a plurality of states, wherein at least one of the plurality of states represents a user input; and a controller electrically connected to the illumination circuit and the switch circuit through a single signal wire, the controller including: a drive circuit configured to provide a drive signal to the illumination circuit via the single signal wire; and a sensing circuit configured to detect a state of the switch circuit.

In some aspects, the techniques described herein relate to an illuminated interface system, wherein the user input is a button push.

In some aspects, the techniques described herein relate to an illuminated interface system, wherein the drive circuit includes a load switch configured to toggle between being open and closed, wherein the drive circuit provides the drive signal via the single signal wire when the load switch is closed, and wherein the sensing circuit is configured to detect the state of the switch circuit when the load switch is opened.

In some aspects, the techniques described herein relate to an illuminated interface system, wherein illumination circuit is configured to not interfere with the sensing circuit detecting the state of the switch circuit when the load switch is open.

In some aspects, the techniques described herein relate to an illuminated interface system, wherein the drive signal is configured to provide the drive signal according to a pulse width modulation (PWM) signal.

In some aspects, the techniques described herein relate to an illuminated interface system, wherein the PWM signal has a frequency not exceeding 250 Hertz, and wherein a duty cycle of the PWM signal is no more than 95%.

In some aspects, the techniques described herein relate to an illuminated interface system, wherein the illumination circuit and the switch circuit are connected in parallel with each other.

In some aspects, the techniques described herein relate to an illuminated interface system, wherein the sensing circuit includes an analog-to-digital converter.

In some aspects, the techniques described herein relate to an illuminated interface system including: an illumination circuit configured to illuminate a light source; a switch circuit configurable into a plurality of states, wherein at least one of the plurality of states represents a user input; and a controller electrically connected to the illumination circuit and the switch circuit, the controller configured to cause the illumination circuit to illuminate a light source using a pulse width modulation signal, and the controller configured to detect a state of the switch circuit during an off state of the pulse width modulation signal.

In some aspects, the techniques described herein relate to an illuminated interface system, wherein user input is a button push.

In some aspects, the techniques described herein relate to an illuminated interface system, wherein the pulse width modulation signal has a frequency not exceeding 250 Hertz.

In some aspects, the techniques described herein relate to an illuminated interface system, wherein the controller includes a first power supply and a second power supply, wherein the first power supply is configured to supply power to the illumination circuit to illuminate the light source, and wherein the second power supply is configured to supply power to the switch circuit for detecting the state of the switch circuit.

In some aspects, the techniques described herein relate to an illuminated interface system, wherein a supply voltage of the first power supply is higher than a supply voltage of the second power supply.

In some aspects, the techniques described herein relate to an illuminated interface system, wherein the controller includes an analog-to-digital converter, and wherein the controller uses the analog-to-digital converter to detect the state of the switch circuit during an off state of the pulse width modulation signal.

In some aspects, the techniques described herein relate to an illuminated interface system, wherein the switch circuit includes a plurality of switches connected in parallel with each other.

In some aspects, the techniques described herein relate to an illuminated interface system, wherein the illumination circuit includes (i) a light emitting diode (LED) and (ii) a circuit configured to block a current through the LED during the off state of the pulse width modulation signal, and wherein the LED is the light source.

In some aspects, the techniques described herein relate to an illuminated interface system, further including an electrostatic discharge protection circuit connected in parallel with the illumination circuit and the switch circuit.

In some aspects, the techniques described herein relate to a vehicle including: a user interface; an illumination circuit configured to provide illumination associated with the user interface; a switch circuit configurable into a plurality of states, wherein at least one of the plurality of states represents a user input at the user interface; and a controller in communication with the illumination circuit and the switch circuit via a single signal wire, the controller including a processing circuit configured to drive the illumination circuit and sense a state of the switch circuit.

In some aspects, the techniques described herein relate to a vehicle, wherein the user interface is a button, and wherein the user input is a push of the button.

In some aspects, the techniques described herein relate to a vehicle, wherein in response to the user input, the controller causes the illumination circuit to provide illumination associated with the user interface.

BRIEF DESCRIPTION OF THE DRAWINGS

Throughout the drawings, reference numbers are re-used to indicate correspondence between referenced elements. The drawings are provided to illustrate examples of the subject matter described herein and not to limit the scope thereof.

Embodiments of the present disclosure are described with reference to the accompanying drawings, in which like reference characters reference like elements, and wherein.

DETAILED DESCRIPTION OF CERTAIN EMBODIMENTS

Figure 1:
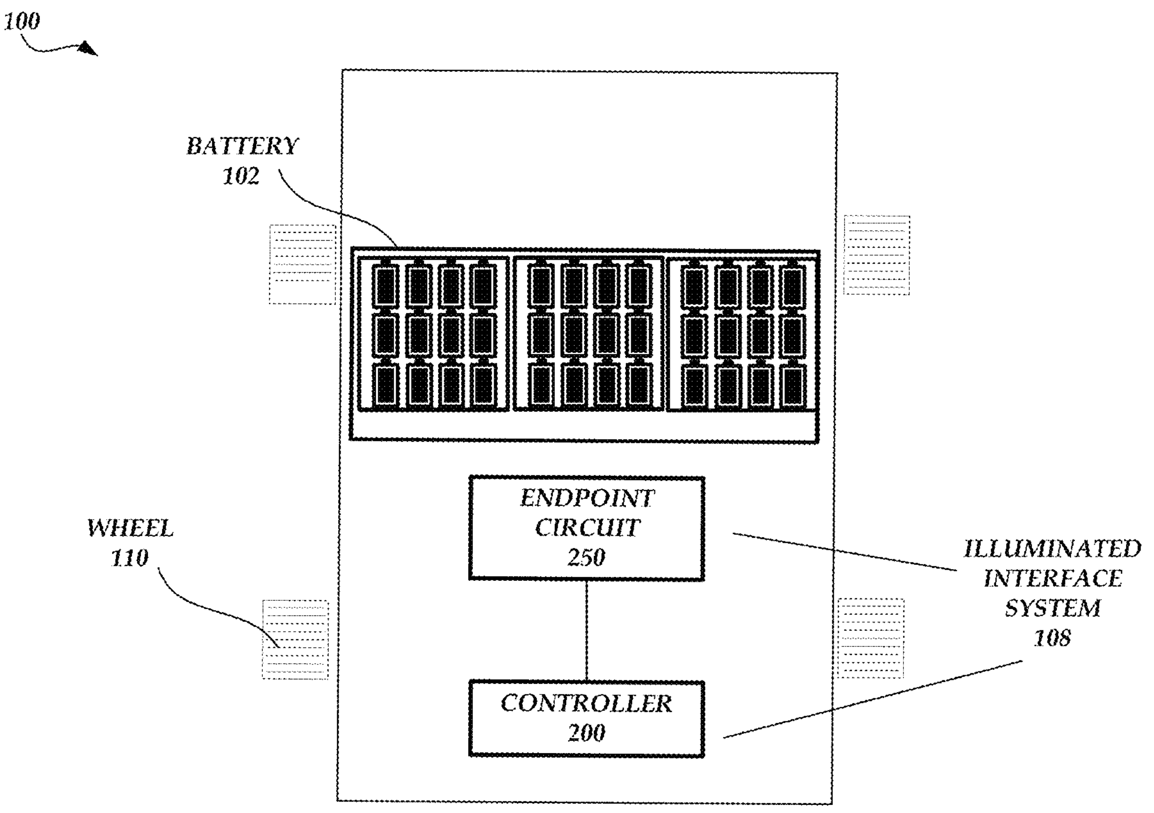
FIG. 1 is a schematic block diagram of an example vehicle including an illuminated interface system in which embodiments of the present disclosure can be implemented.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. Any suitable principles and advantages of the embodiments disclosed herein can be implemented together with each other.

Generally described, one or more aspects of the present disclosure relate to systems and/or methods that control lighting and detect user input on illuminated interfaces (e.g., illuminated buttons of a vehicle). More specifically, embodiments of the present disclosure disclose an illuminated interface system that controls illumination of a light source and detects switch states (e.g., states of switches corresponding to buttons pressed by users) through shared hardware. Rather than using a wire for controlling illumination and another wire for detecting a switch state, the illuminated interface system utilizes a single signal wire to control an illumination circuit for controlling illumination of a light source and to detect a switch state of one or more switches that switch according to user input (e.g., a button press). In some embodiments, the illuminated interface system turns off or minimizes a current drawn by the illumination circuit while detecting switch states to accomplish accurate switch states detection, allowing the illuminated interface system to effectively facilitate desired operations according to detected switch states.

Advantageously, by utilizing a single signal wire and/or a single electrical connection terminal for both functionalities of illumination and switch state detection, the illuminated interface system can achieve reduced wiring complexity and occupy less space relative to designs that use separate wires for illumination and detecting switch state. By interleaving (e.g., time interleaving) the functionalities of illumination and switch state detection (e.g., using a pulse width modulation (PWM) signal), the illuminated interface system enables the illumination circuit to be on during certain periods to emit light and be off during detection of switch states, thereby advantageously achieving accurate switch states detection without interference from the illumination circuit.

Illuminated interfaces can be widely used in various applications to enhance user interaction and visibility. For example, illuminated buttons such as window lifts, interior door release buttons, external door release button, a trunk button, a frunk emergency release button, a liftgate shutter switch, or map lights have been deployed in vehicles. The integration of illuminated buttons can present technical challenges related to wiring complexity and power management. For example, certain existing solutions utilize separate circuits for illumination and switch state detection, which can result in inefficiencies, more complex wiring, and increased power consumption.

In some cases, a dedicated signal line (e.g., a wire) is used for controlling illumination, and another dedicated signal line is used for detecting user input to buttons. These designs often involve additional components to manage the interaction between the illumination and sensing functions, complicating the circuit design and potentially affecting reliability.

To address at least a portion of the above identified technical problems, aspects of the disclosed technology relate to an illuminated interface system (e.g., a control and monitor system that includes circuit assembly) that allows for the control of an illumination circuit (e.g., a circuit that includes a light source such as a light emitting diode (LED)) and the monitoring of one or more switches over a single wire.

In some embodiments, the illuminated interface system controls illumination of a light source and detects switch states (e.g., states of switches associated with buttons pressed by users) through a single signal wire, plus a ground connection. The ground connection is not considered a signal wire in the context of this disclosure. Rather than using a wire for controlling illumination and another wire for detecting switch states, the illuminated interface system utilizes the single wire to turn on or off an illumination circuit for controlling illumination and to detect switch states of one or more switches that switch according to user interactions (e.g., a button press). In some embodiments, the illuminated interface system turns off or minimizes a current drawn by the illumination circuit while detecting switch states to accomplish accurate switch states detection, allowing the illuminated interface system to effectively facilitate desired operations according to detected switch states.

In some embodiments, the illuminated interface system includes an endpoint circuit and a controller. The endpoint circuit can refer to and include at least an interface circuit or a switch assembly through which a user may interact with the illuminated interface system. The endpoint circuit and the controller can be located at different locations and electrically connected by a wire. The endpoint circuit includes an illumination circuit and a switch circuit. The illumination circuit and the switch circuit are electrically connected to the controller through a first terminal of the endpoint circuit and a single signal wire. The controller can include any suitable processing circuit to perform the functions of the controller disclosed herein. For example, the controller can include a load switch and a sensing circuit. The load switch is configured to toggle (e.g., according to a PWM signal) for controlling and monitoring the endpoint circuit through the single signal wire. When the load switch opens, the sensing circuit can detect switch states of the switch circuit. Additionally, when the load switch opens, the load switch can cause the illumination circuit to turn off such that the illumination circuit does not significantly interfere with (e.g., by drawing some current) or noticeably impact the sensing circuit detecting the switch states of the switch circuit. When the load switch closes, the load switch causes the illumination circuit to turn on for illuminating a light source. The controller can include any additional control circuitry to provide control functionality for the load switch and the sensing circuit.

In some embodiments, the illumination circuit (e.g., LED control circuitry) and the switch circuit are electrically connected in parallel. For example, one end of the illumination circuit and the switch circuit can be connected to the first terminal of the endpoint circuit, where the first terminal of the endpoint circuit is electrically connected to the controller through the single signal wire. The other end of the illumination circuit and the switch circuit can be connected to a ground potential. The ground potential can be connected to components in both the controller and the endpoint circuit. Additionally and/or optionally, a electrostatic discharge (ESD) circuit and a pull-down resistor can be electrically connected in parallel with the illumination circuit and the switch circuit.

The switch circuit can include one or more switches. For example, the switch circuit can include one switch that is serially connected to a resistor. As another example, the switch can include a plurality of switches (e.g., two switches, three switches, or four switches) connected in parallel with each other. Each switch of the plurality of switches can be serially connected to a corresponding resistor. Each of the switch(es) in the switch circuit can be associated with one or more illuminated buttons that are pressed by a user. By detecting switch states of the switch circuit (e.g., close and/or open of switch(es) of the switch circuit), the illuminated interface system can facilitate various user operations according to detected switch states.

As noted above, the controller can include a load switch and a sensing circuit. In some embodiments, the load switch switches according to a PWM signal. For example, the load switch can open when the PWM signal has a low voltage. The load switch can close when the PWM signal has a high voltage. When the load switch is closed, a first power supply of the controller supplies a first voltage (e.g., a voltage greater than 5 Volts (V)) through the single signal wire and the first terminal to the illumination circuit to cause a light source to illuminate. When the load switch is open, a second power supply of the controller can supply power to the endpoint circuit. Because a supply voltage of the second power supply is lower than the supply voltage of first power supply, the illumination circuit (e.g., the LED control circuitry) can be turned off without drawing significant current. In some instances, a relatively small leakage current (e.g., less than twelve microamperes) is consumed by the illumination circuit. As such, the sensing circuit of the controller can detect a switch state of the switch circuit without significant interference or impact by the illumination circuit.

Although the various aspects will be described in accordance with illustrative embodiments and combinations of features, one skilled in the relevant art will appreciate that the examples and combinations of features are illustrative in nature and should not necessarily be construed as limiting. More specifically, aspects of the present application may be applicable with various types of illuminated interfaces (e.g., electronic and/or mechanical user interfaces including buttons, switches, or the like in or around windows, doors, roofs, or other parts of a vehicle) associated with a vehicle under different contexts. Still further, although specific architectures of circuitry block diagrams for controlling lighting and detecting user interactions associated with a user interface (e.g., an illuminated button) will be described, such illustrative circuitry block diagrams or architecture should not necessarily be construed as limiting. Accordingly, one skilled in the relevant field of technology will appreciate that the aspects of the present application are not necessarily limited to being applied to any particular types of illuminated interfaces associated with vehicles.

FIG. 1 depicts a schematic block diagram of an example electric vehicle 100 in which embodiments of the present disclosure can be implemented. Although the example electric vehicle 100 is illustrated in FIG. 1, any suitable principles and advantages of the present disclosure can be implemented on any other suitable vehicles. As shown in FIG. 1, the electric vehicle 100 includes at least a battery 102, an illuminated interface system 108, and wheels 110.

The battery 102 can provide power to various components of the electric vehicle 100, such as the illuminated interface system 108. The battery 102 may connect to various vehicle sub-systems, such as the illuminated interface system 108 and other subsystems not shown in FIG. 1, supplying energy for both propulsion and auxiliary functions.

The wheels 110 enable the mobility of the electric vehicle 100. While not directly involved in user interface input detection or illumination, the wheels 110 support the overall vehicle structure and contribute to the vehicle's stability and performance. Although in the example of FIG. 1 the illuminated interface system 108 is illustrated to be a part of the electric vehicle 100, the illuminated interface system 108 can be used for non-vehicle applications. For example, the illuminated interface system 108 can be a part of a non-movable structure (e.g., a building, a room) or other types of transportation tools.

In some embodiments, the illuminated interface system 108 can control illumination of a light source and detect switch states through shared hardware. Rather than using a wire for controlling illumination and another wire for detecting switch states, the illuminated interface system 108 utilizes a single signal wire to turn on or off an illumination circuit for controlling illumination and to detect switch states of one or more switches that switch according to user interactions (e.g., a user press on a button associated with the illuminated interface system 108). In some embodiments, the illuminated interface system 108 turns off or minimizes a current drawn by the illumination circuit while detecting switch states to accomplish accurate switch states detection, allowing the illuminated interface system 108 to effectively facilitate desired operations according to detected switch states.

In some embodiments, the illuminated interface system 108 includes an endpoint circuit (e.g., the endpoint circuit 250) and a controller (e.g., the controller 200). In some instances, the controller 200 and the endpoint circuit 250 can be relatively far from each other in the electric vehicle 100. A harness can electrically connect the controller 200 and the endpoint circuit 250. Embodiments disclosed herein can reduce the number of wires in the harness. The endpoint circuit includes an illumination circuit and a switch circuit. The illumination circuit and the switch circuit are electrically connected to the controller through a first terminal of the endpoint circuit and a single wire. The controller can include a load switch and a sensing circuit. The load switch is configured to toggle (e.g., according to a PWM signal) for controlling and monitoring the endpoint circuit through the single signal wire. When the load switch is open, the sensing circuit detects switch states of the switch circuit. When the load switch is closed, the load switch causes the illumination circuit to turn on for illuminating. Additionally, when the load switch is open, the illumination circuit to turn off such that the illumination circuit does not interfere with (e.g., by drawing some current) the sensing circuit detecting the switch states of the switch circuit. Example detailed structures or components of the illuminated interface system 108 will be described below with reference to FIGS. 2, 3, 4, and 5.

Figure 2:
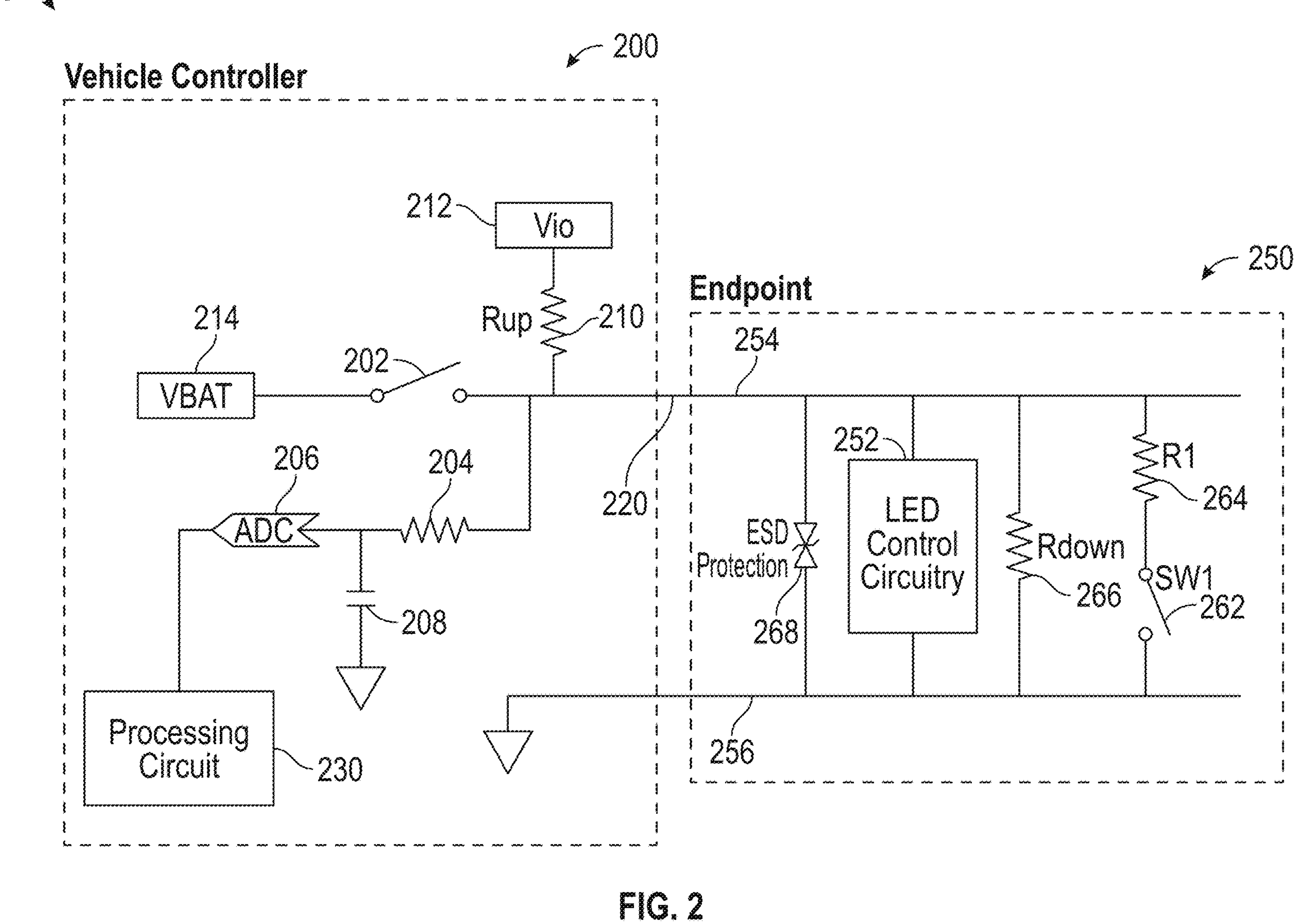
FIG. 2 is a schematic circuit diagram of components of an example embodiment of the illuminated interface system of FIG. 1.

FIG. 2 is a schematic circuit diagram of components of an example embodiment of the illuminated interface system 108 of FIG. 1. The illuminated interface system 108 can include fewer or more components than illustrated in FIG. 2. As shown in FIG. 2, the illuminated interface system 108 includes a controller 200 and an endpoint circuit 250. The controller 200 can be a vehicle controller when implemented in a vehicle, such as the electric vehicle 100 of FIG. 1. The controller 200 can include any suitable processing circuitry to perform the disclosed functionality.

As illustrated, the controller 200 includes a load switch 202, a resistor 204, an analog-to-digital converter (ADC) 206, a capacitor 208, a resistor 210, a power supply 212, and a power supply 214. The resistor 204, ADC 206, capacitor 208, the resistor 210, and/or the power supply 212 can form at least a portion of a sensing circuit for monitoring and detecting switch states (e.g., states of one or more switches associated with one or more buttons pressed or pushed by users) associated with the endpoint circuit 250. For example, the controller 200 can manage and monitor the operations of the endpoint circuit 250 by controlling the load switch 202 and the sensing circuit. The controller 200 can toggle the load switch 202, enabling the control and monitoring of the endpoint circuit 250 through a single signal wire 220. The load switch 202 and the power supply 214 can form at least a portion of a drive circuit to drive the endpoint circuit 250 to illuminate.

The endpoint circuit 250 includes an illumination circuit 252, a resistor 266, a resistor 264, a switch 262, and an electrostatic detection (ESD) protection circuit 268. The resistor 264 and the switch 262 can form at least a portion of a switch circuit. As shown in FIG. 2, the illumination circuit 252, the switch circuit that includes the resistor 264 and the switch 262, the ESD protection circuit 268, and the resistor 266 are connected in parallel. More specifically, one end of each of the illumination circuit 252, the switch circuit, the ESD circuit 268, and the resistor 266 is connected to a first terminal 254 of the endpoint circuit 250, where the first terminal 254 is electrically connected to the controller 200 through the single signal wire 220. The other end of each of the illumination circuit 252, the switch circuit, the ESD circuit 268, and the resistor 266 is connected to ground (e.g., at a second terminal 256 of the endpoint circuit 250). The controller 200 and the endpoint circuit 250 can both be connected to ground. The controller 200 can toggle (e.g., using a PWM signal) the load switch 202 to control the illumination circuit 252 to illuminate light and detect states (e.g., open or close) of the switch 262.

In some embodiments, the power supply 214 and the power supply 212 provide power to the controller 200 and the endpoint circuit 250. As shown in FIG. 2, a supply voltage of the power supply 212 can be 5 V or 3.3 V. The supply voltage of the power supply 212 can be any other suitable voltage. A supply voltage of the power supply 214 can be higher than the supply voltage of the power supply 212. The power supply 214 and the power supply 212 can receive power from and/or be integrated within a part of the battery 102 of the electric vehicle 100 of FIG. 1.

The ADC 206 can be a part of a sensing circuit within the controller 200 for detecting switch states associated with the endpoint circuit 250. The ADC 206 can convert analog signals (e.g., voltages indicative of switch states of the switch 262) into digital signals for further processing by a processing circuit 230 to determine the switch states. This conversion and determination can allow the illuminated interface system 108 to accurately detect the switch states, facilitating the desired operations based on user input. As show in FIG. 2, the processing circuit 230 is included within the controller 200. It should be noted that the processing circuit 230 can also be deployed outside the controller 200.

The resistor 204 and the capacitor 208 can form at least a portion of a sensing circuit that also includes the ADC 206. The resistor 204 and the capacitor 208 may stabilize the voltage and/or current detected by the ADC 206. For example, the resistor 204 and the capacitor 208 can filter out noise and/or provide a stable voltage potential to the ADC 206.

In some embodiments, the illumination circuit 252 includes components such as resistors and diodes that regulate the current flow through a light emitting diode (LED). In some embodiments, a total capacitance associated with the illumination circuit 252 is less than 1 nano-farad (nF). For example, a leakage current associated with the illumination circuit 252 can be less than 12 microamperes when a supply voltage of the power supply 212 is 5 V. As another example, a leakage current associated with the illumination circuit 252 can be less than 8 microamperes when a supply voltage of the power supply 212 is 3.3 V. The illumination circuit 252 can operate at a frequency in a range up to 250 Hertz (Hz) (e.g., the PWM signal that causes the load switch 202 to toggle has a frequency of 250 Hz) in certain applications. Example circuitry of the illumination circuit 252 will be described below with reference to FIGS. 4 and 5.

In some embodiments, the switch 262 can toggle between open and closed states in response to a user input. For example, the switch 262 can be a part of a user interface such as a button (e.g., a button 602 shown in FIG. 6) or connected to the button such that the switch 262 toggle in response to a user press or a user operation on the button. The switch 262 can be a mechanical switch or any other suitable type of switch, such as capacitive or touch-sensitive switches. In some embodiments, in response to a user interaction on a button connected to the switch 262, a wake-up signal can be generated to wake-up one or more components of the illuminated interface system 108 (e.g., the controller 200).

The ESD protection circuit 268 can provide protection against electrostatic discharge, safeguarding the components of the endpoint circuit 250. Any other suitable electrical overstress protection circuit can be implemented in place of or in addition to the ESD protection circuit 268. As shown in FIG. 2, the ESD protection circuit 268 is connected in parallel with the illumination circuit 252, the resistor 266 (e.g., a pull down resistor), and the switch circuit that includes the switch 262 and the resistor 264. The ESD protection circuit 268 can ensure that any electrostatic discharge is safely dissipated without causing damage to the illuminated endpoint circuit 250.

In some embodiments, the load switch 202 can be controlled by a control signal (e.g., a PWM signal generated by a PWM signal generator of the controller 200 that is not shown in FIG. 2). The load switch 202 can toggle (e.g., switch between open and closed) according to the PWM signal. When the load switch 202 is open as shown in FIG. 2, the sensing circuit (e.g., circuitry including the ADC 206 and a decoder) can detect switch states of the switch 262. When the load switch 202 is closed, the load switch 202 causes the illumination circuit 252 to turn on for illuminating. Additionally, when the load switch 202 is open, the illumination circuit 252 to turn off such that the illumination circuit 252 does not interfere with (e.g., by drawing some current from the power supply 212) the ADC 206 detecting the switch states of a switch circuit that includes the switch 262.

More specifically, the load switch 202 can be open in response to the PWM signal being at a low voltage (e.g., around 0 V). The load switch 202 can be closed in response to the PWM signal is at a high voltage (e.g., around 5 V or around 3.3 V). When the load switch 202 closes, the power supply 214 supplies a first voltage (e.g., a voltage greater than 5 V) through the single signal wire 220 and the first terminal 254 to the illumination circuit 252 to cause (e.g., by turning on a LED of the illumination circuit 252) the illumination circuit to illuminate. When the load switch 202 is closed, the ADC 206 may not detect switch states of a switch circuit that includes the switch 262.

When the load switch 202 is open, the electrical connection between the power supply 214 and the endpoint circuit 250 can be cut off, and the power supply 212 supplies power through the resistor 210 (e.g., a pull up resistor) to the endpoint circuit 250. Because a supply voltage of the power supply 212 is lower (e.g., 5 V or 3.3 V) than the supply volage of the power supply 214, the illumination circuit 252 can be turned off without drawing current (though the illumination circuit 252 may still consume leakage current that is negligible or may not interference with accurately detecting a switch state of the switch 262). Depending on whether the switch 262 is open or closed, the ADC 206 can convert different voltages into a digital signal for determining whether the switch 262 is open or closed. For example, if the switch 262 is open, the ADC 206 may convert a voltage potential that is higher (e.g., around 0.9 of a supply voltage of the power supply 212) because little or no current passes through the resistor 264 such that voltage drop across the resistor 210 is less. If the switch 262 is closed, the ADC 206 may convert a voltage potential that is lower (e.g., around 0.1 of the supply voltage of the power supply 212) because more current passes through the resistor 264 such that voltage drop across the resistor 210 is higher. As such, the ADC 206 can detect the switch state of the switch 262 (e.g., detecting whether the switch 262 is open or closed) when the load switch 202 is open.

In some embodiments, the PWM signal has a frequency of up to 250 Hz, and a duty cycle of the PWM signal is no more than 95%. For example, the PWM signal may have a duty cycle of 95% and a frequency of 250 Hz. In this example, during a period of the PWM signal, the load switch 202 may open during 5% of time, and may closed during 95% of time. Advantageously, the 5% of time of the period of the PWM signal can provide sufficient time for the ADC 206 to be used to accurately detect switch states of the switch 262. Further, the illumination circuit 252 may be driven during 95% of time and be off (e.g., not illuminating light) during 5% of time, which can be imperceptible to users (e.g., users may not perceive flicker of a LED). In other examples, the PWM signal can have a frequency of 500 Hz, 1000 Hz, or another higher frequency. For example, the PWM signal can have a frequency of 500 Hz when a duty cycle of the PWM is no more than 90%. As another example, the PWM signal can have a frequency of 1000 Hz when a duty cycle of the PWM is no more than 80%.

Figure 3:
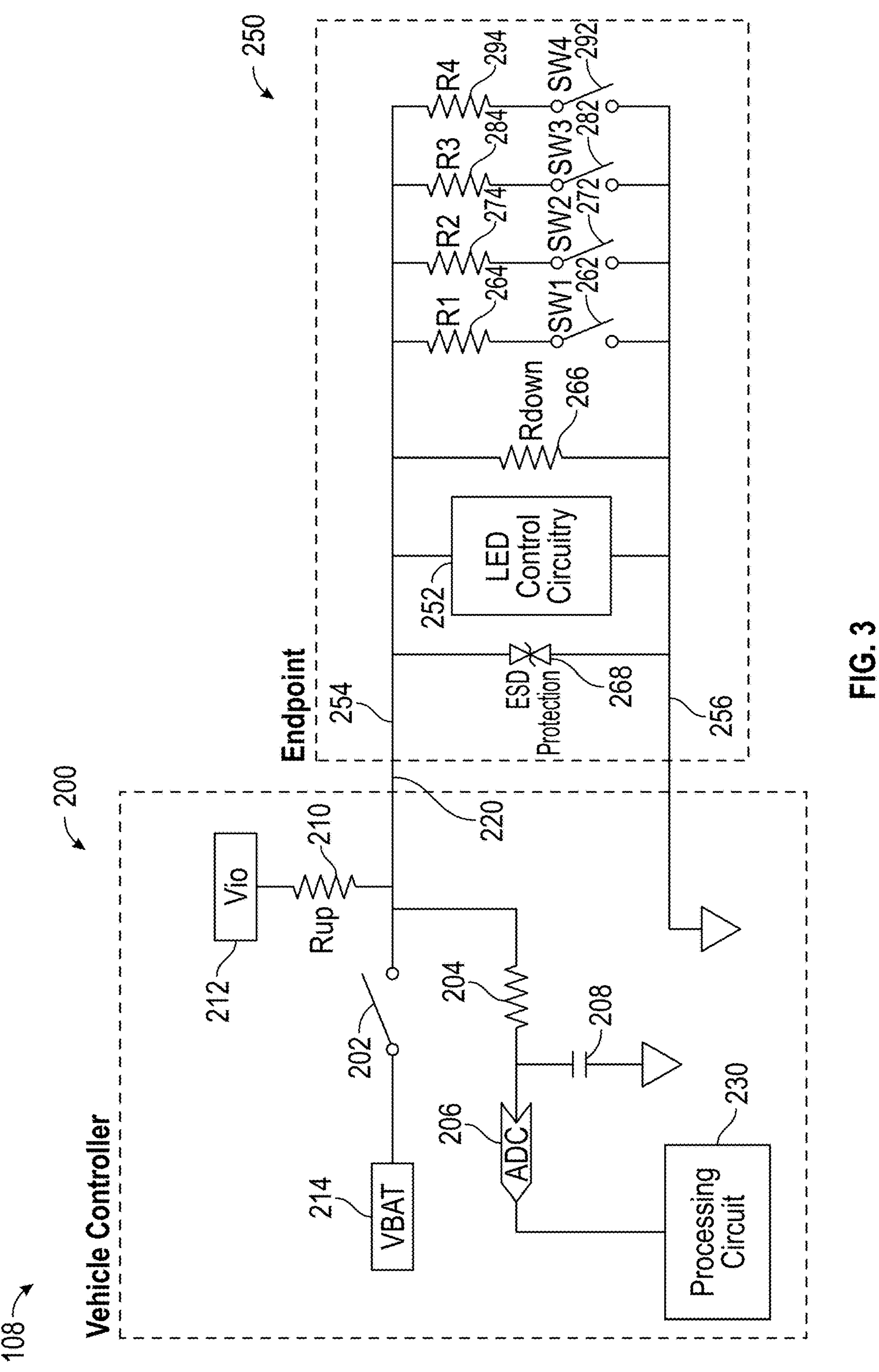
FIG. 3 is another schematic circuit diagram of components of another example embodiment of the illuminated interface system of FIG. 1.

FIG. 3 is another diagram of components of another example embodiment of the illuminated interface system 108 of FIG. 1. The illuminated interface system 108 can include fewer or more components than illustrated in FIG. 3. Unless otherwise noted, components of FIG. 3 can be structurally and/or functionally the same as or generally similar to like components of FIG. 2. Compared with FIG. 2, FIG. 3 shows that the endpoint circuit 250 can further include a switch circuit plurality of switches in parallel with each other. The switch circuit of the endpoint circuit 250 includes a switch 272 in series with a resistor 274, a switch 282 in series with a resistor 284, and a switch 292 in series with a resistor 294, in addition to the switch 262 in series with the resistor 264. Each of the switches 262, 272, 282, and 292 are in parallel with each other.

In some embodiments, one or more of the switches 262, 272, 282, and 292 can be associated with (e.g., mechanically and/or electrically connected to) one or more user interfaces (e.g., buttons, switches, or other components not shown in FIG. 3) of a vehicle such as the electric vehicle 100. For example, each of the switches 262, 272, 282, and 292 can be associated with or corresponded to an individual button. As another example, two or more of the switches 262, 272, 282, and 292 can be associated with a single button. For instance, the switches 262, 272, 282, and 292 can be used to determine states of a window lift of vehicle (e.g., no press, half down, full down, half up, full up). As another example, two switches (e.g., the switch 262 and the switch 272) can be associated with a single button while the switch 282 and the switch 292 can each be associated with an individual button. Responsive to a user press on a corresponding button, the switches 262, 272, 282, and/or 292 may toggle. Different switch states associated with the switches 262, 272, 282, and 292 can result in different voltage potentials measured and/or converted by the ADC 206. Based on readings (e.g., sensing signals) generated by the ADC 206, a processing circuit (not shown in FIG. 3) in communication with the controller 200 can determine switch states or configurations associated with the switches 262, 272, 282, and 292, thereby facilitating desired operation based on the switch states.

For example, when none of the switches 262, 272, 282, and 292 is closed (e.g., each of the switches 262, 272, 282, and 292 is open), the ADC 206 may convert a voltage potential that is around 0.909 of a supply voltage of the power supply 212. In some embodiments, sizes and/or electrical characteristics of the switches 262, 272, 282, and 292 can be different to cause the ADC 206 to generate different readings (e.g., different outputs from the ADC 206). Alternatively, each of the switches 262, 272, 282, and 292 can be generally the same and the values of the resistor 264, resistor 274, resistor 284, and resistor 294 can be different. For example, when only the switch 292 closes, the ADC 206 may convert a voltage potential that is around 0.737 of the supply voltage of the power supply 212. When only the switch 282 closes, the ADC 206 may convert a voltage potential that is around 0.566 of the supply voltage of the power supply 212. When only the switch 272 closes, the ADC 206 may convert a voltage potential that is around 0.389 of the supply voltage of the power supply 212. When only the switch 262 closes, the ADC 206 may convert a voltage potential that is around 0.208 of the supply voltage of the power supply 212. Based on the output of the ADC 206, the processing circuit can determine switch states of a switch circuit that includes the switches 262, 272, 282, and 292 to cause an operation associated with the electric vehicle 100 accordingly.

In some embodiments, the endpoint circuit 250 can support simultaneous press detection, for example, when there are two switches within a switch circuit of the endpoint circuit 250. For example, when the switch circuit includes the switch 262 and the switch 272 but does not include the switch 282 and switch 292, the endpoint circuit 250 can support simultaneous press detection on the switch 262 and switch 272. More specifically, when a user simultaneously presses the switches 262 and 272 or one or more buttons that are associated with the switches 262 and 272, the controller 200 can detect that both switches 262 and 272 are pressed.

Table 1A and Table 1B provide example component values and corresponding ADC readings (e.g., output generated by the ADC 206) when the endpoint circuit 250 of the illuminated interface system 108 is implemented to include the switch 262 without including the switches 272, 282, and 292, as shown in FIG. 2.

Table 1A lists the resistances of the resistor 210 (e.g., Rup), the resistor 266 (e.g., Rdown), and the resistor 264 (e.g., R1). The resistances are designed to ensure accurate detection of the switch states.

Table 1B provides outputs generated by the ADC 206 (e.g., ADC readings) corresponding to different switch states (e.g., short circuit, switch closed, switch open, and open circuit) of the switch 262. As shown in Table 1B, the ADC readings are related to the equivalent resistance of the switch 262 in each switch state. The switch states include short circuit, switch closed, switch open, and open circuit. Each switch state corresponds to a specific equivalent resistance, which results in a distinct ADC reading. These readings can be used by the processing circuit 230 to determine the switch states of the switch 262 accurately to facilitate desired user operations.

TABLE 1A

| COMPONENT VALUES 1 switch | |
|---|---|
| Resistor | Value |
| Rup | 10k + −1% |
| Rdown | 100k + −5% |
| R1 | 1k + −5% |
| R2, R3, R4 | N/A |

TABLE 1B

| ADC READINGS | | |
|---|---|---|
| State | Equivalent Resistance | ADC reading, nominal |
| Short circuit | 0 | 0*Vio |
| Switch closed | 0.99k | 0.090*Vio |
| Switch open | 100k | 0.909*Vio |
| Open circuit | N/A | 1*Vio |

Table 2A and Table 2B provide example component values and corresponding ADC readings (e.g., output generated by the ADC 206) when the endpoint circuit 250 of the illuminated interface system 108 is implemented to include the switches 262 and 272 without including the switches 282 and 292.

Table 2A lists the resistances of the resistor 210 (e.g., Rup), the resistor 266 (e.g., Rdown), the resistor 264 (e.g., R1), and the resistor 274 (e.g., R2). Table 2B provides outputs generated by the ADC 206 (e.g., ADC readings) corresponding to different switch states (e.g., both switches 262 and 272 short circuit, both switches 262 and 272 closed, one switch closed and the other open, and both switches 262 and 272 open, both switches 262 and 272 open circuit) of the switches 262 and 272. As shown in Table 2B, the ADC readings are related to the equivalent resistance of the switches 262 and 272 in each switch state. Each switch state corresponds to a specific equivalent resistance, which results in a distinct ADC reading. These readings can be used by the processing circuit 230 to determine the switch states of the switches 262 and 272 accurately to facilitate desired user operations.

TABLE 2A

| COMPONENT VALUES 2 switches | |
|---|---|
| Resistor | Value |
| Rup | 10k + 1% |
| Rdown | 82k + −5% |
| R1 | 10k + −5% |
| R2 | 18k + 5% |
| R3, R4 | N/A |

TABLE 2B

| ADC READINGS | | | |
|---|---|---|---|
| SW1 State | SW2 State | Equivalent Resistance | ADC reading, nominal |
| Short circuit | | 0 | 0*Vio |
| Closed | Closed | 5.96k | 0.373*Vio |
| Closed | Open | 8.91k | 0.471*Vio |
| Open | Closed | 14.76k | 0.596*Vio |
| Open | Open | 82k | 0.891*Vio |
| Open circuit | | N/A | 1*Vio |

Table 3A and Table 3B provide example component values and corresponding ADC readings (e.g., output generated by the ADC 206) when the endpoint circuit 250 of the illuminated interface system 108 is implemented to include the switches 262, 272, and 282 without including the switch 292.

Table 3A lists the resistances of the resistor 210 (e.g., Rup), the resistor 266 (e.g., Rdown), the resistor 264 (e.g., R1), the resistor 274 (e.g., R2), and the resistor 284 (e.g., R3). Table 3B provides outputs generated by the ADC 206 (e.g., ADC readings) corresponding to different switch states (e.g., switches 262, 272, and/or 282 short circuit, only switch 262 closed, only switch 272 closed, only switch 282 closed, none of the switches 262, 272, and 282 closed, and switches 262, 272, and 282 open circuit) of the switches 262, 272, and 282. As shown in Table 3B, the ADC readings are related to the equivalent resistance of the switches 262, 272, and 282 in each switch state. Each switch state corresponds to a specific equivalent resistance, which results in a distinct ADC reading. These readings can be used by the processing circuit 230 to determine the switch states of the switches 262, 272, and 282 accurately to facilitate desired user operations.

TABLE 3A

| COMPONENT VALUES 3 switches | |
|---|---|
| Resistor | Value |
| Rup | 10k + −1% |
| Rdown | 82k + 5% |
| R1 | 2.7k + −5% |
| R2 | 8.2k + 5% |
| R3 | 27k + 5% |
| R4 | N/A |

TABLE 3B

| ADC READINGS | | |
|---|---|---|
| State | Equivalent Resistance | ADC reading, nominal |
| Short ciruit | 0 | 0*Vio |
| SW1 Closed | 2.61k | 0.207*Vio |
| SW2 Closed | 7.45k | 0.427*Vio |
| SW3 Closed | 20.31k | 0.670*Vio |
| No swtiches closed | 82k | 0.891*Vio |
| Open circuit | N/A | 1*Vio |

Table 4A and Table 4B provide example component values and corresponding ADC readings (e.g., output generated by the ADC 206) when the endpoint circuit 250 of the illuminated interface system 108 is implemented to include the switches 262, 272, 282, and 292, as shown in FIG. 3.

Table 4A lists the resistances of the resistor 210 (e.g., Rup), the resistor 266 (e.g., Rdown), the resistor 264 (e.g., R1), the resistor 274 (e.g., R2), the resistor 284 (e.g., R3), and the resistor 294 (e.g., R4). Table 4B provides outputs generated by the ADC 206 (e.g., ADC readings) corresponding to different switch states (e.g., switches 262, 272, 282, and/or 292 short circuit, only switch 262 closed, only switch 272 closed, only switch 282 closed, only switch 292 closed, none of the switches 262, 272, 282, and 292 closed, and switches 262, 272, 282, and 292 open circuit) of the switches 262, 272, 282, and 292. As shown in Table 4B, the ADC readings are related to the equivalent resistance of the switches 262, 272, 282 and 292 in each switch state. Each switch state corresponds to a specific equivalent resistance, which results in a distinct ADC reading. These readings can be used by the processing circuit 230 to determine the switch states of the switches 262, 272, 282, and 292 accurately to facilitate desired user operations.

TABLE 4A

| COMPONENT VALUES 4 switches | |
|---|---|
| Resistor | Value |
| Rup | 10k + 1% |
| Rdown | 100k + −5% |
| R1 | 2.7k + −5% |
| R2 | 6.8k + −5% |
| R3 | 15k + −5% |
| R4 | 39k + −5% |

TABLE 4B

| ADC READINGS | | |
|---|---|---|
| State | Equivalent Resistance | ADC reading, nominal |
| Short circuit | 0 | 0*Vio |
| SW1 Closed | 2.62k | 0.208*Vio |
| SW2 Closed | 6.37k | 0.389*Vio |
| SW3 Closed | 13.04k | 0.566*Vio |
| SW4 Closed | 28.06k | 0.737*Vio |
| No swtiches closed | 100k | 0.909*Vio |
| Open circuit | N/A | 1*Vio |

Table 5 and Table 6 provide switch states and designed resistances associated with an example window switch that is implemented based on the endpoint circuit 250 of FIG. 3. Table 5 lists the window states for the window switch. The window states include "Auto Up," "Up," "Auto Down," and "Down." Each window state corresponds to a combination of switch states of the switches 262 (e.g., SW1), 272 (e.g., SW2), 282 (e.g., SW3), and 292 (e.g., SW4). For example, when the switch 262 is closed, the switch 272 is closed, the switch 282 is open, and the switch 292 is open, the window state for the window switch is "Auto Up." When the switch 262 is open, the switch 272 is open, the switch 282 is open, and the switch 292 is closed, the window state for the window switch is "Down." Table 5 also identifies the active resistors (e.g., which of the resistor 264, the resistor 274, the resistor 284, and the resistor 294 have impact on the equivalent resistance) and the required equivalent resistance correspond to each window state.

TABLE 5

| State | SW1 | SW2 | SW3 | SW4 | Active Resistors | Required equivalent resistance (ignoring Rdown) |
|---|---|---|---|---|---|---|
| Auto Up | Closed | Closed | Open | Open | R1//R2 | 2.7k + −5% |
| Up | Open | Closed | Open | Open | R2 | 6.8k + −5% |
| Auto Down | Open | Open | Closed | Closed | R3//R4 | 15k + −5% |
| Down | Open | Open | Open | Closed | R4 | 39k + −5% |

Table 6 provides example resistances for the resistor 264, the resistor 274, the resistor 284, and the resistor 294. These resistances can be selected based on the required equivalent resistances listed in Table 5. The resistance can ensure that the processing circuit 230 can accurately detect the switch states of the switches 262, 272, 282, and 292 to facilitate the desired operations based on user interactions. If the resistances for the resistor 264, the resistor 274, the resistor 284, and/or the resistor 294 are not standard resistor values, tighter tolerance resistors within the specified range of resistances in Table 6 can be used to achieve the required equivalent resistances.

TABLE 6

| Resistor | Value |
|---|---|
| R1 | 4.48K + −5% |
| R2 | 6.8K + −5% |
| R3 | 24.4K + −5% |
| R4 | 39K + −5% |

Figure 4:
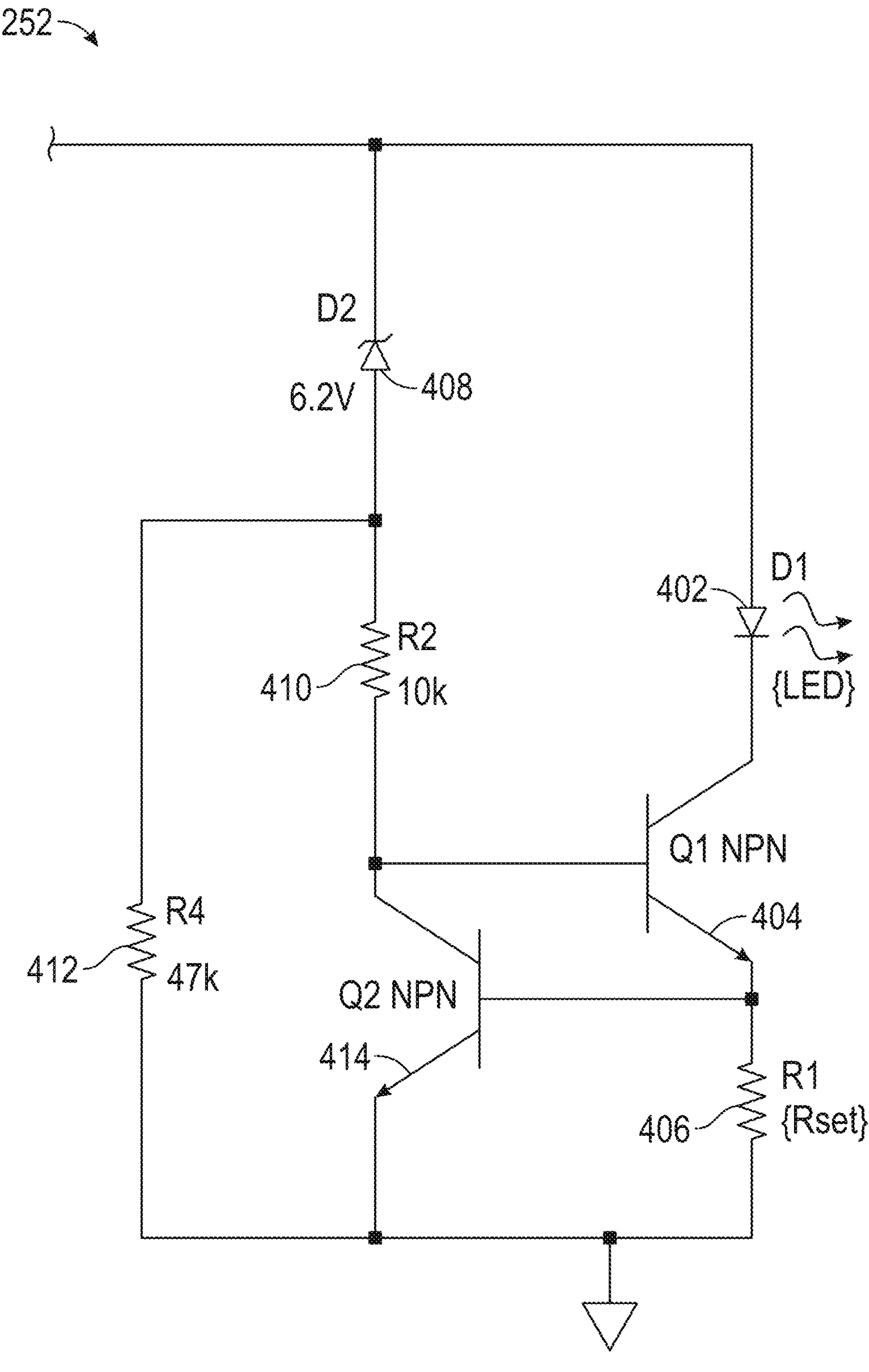
FIG. 4 is a schematic circuit diagram of components of an example embodiment of an illumination circuit of FIG. 2 or 3.

FIG. 4 is a schematic circuit diagram of components of an example embodiment of the illumination circuit 252 of FIG. 2 or 3. The illumination circuit 252 can include fewer or more components than illustrated in FIG. 4. As shown in FIG. 4, the illumination circuit 252 includes a light emitting diode (LED) 402, a transistor 404, a resistor 406, a Zener diode 408, a resistor 410, a resistor 412, and a transistor 414. The LED 402 can illuminate when the load switch 202 within the controller 200 is closed. The LED 402 can be unilluminated when the load switch 202 is open. The illumination circuit 252 illustrated in FIG. 4 can provide generally constant current regulation.

As illustrated in FIG. 4, the transistor 404 is connected to the LED 402. The transistor 404 in conjunction with the resistor 406 may be used to control the current flow through the LED 402. The transistor 404 can be implemented using any suitable type of transistor, such as a bipolar junction transistor (BJT) or a field-effect transistors (FET), depending on the specification of the circuit. The transistor 404 and/or the resistor 406 can set the current flowing through the LED 402 to provide adequate illumination.

As noted above, the resistor 406 can set and/or regulate the current flowing through the LED 402, preventing excessive current that could damage the LED 402. As shown in FIG. 4, the resistor 406 is connected in series with the LED 402 and the transistor 404. The value of the resistor 406 can be selected based on the desired current level and the voltage supply to the illumination circuit 252.

The Zener diode 408 can be connected in parallel with the LED 402 and the transistor 404. The Zener diode 408 can block current flow (e.g., current flowing through the LED 402) until a supply voltage for the illumination circuit 252 reaches a specified threshold (e.g., about 7 V). The Zener diode 408 can ensure that the LED 402 remains off when the supply voltage is below the threshold, allowing for accurate switch state detection without interference from the illumination circuit 252. In the example of FIG. 4, the Zener diode 408 is a low leakage 6.2 V Zener diode. Any other suitable circuit can be implemented to block current through the LED 402 during the off state of a PWM signal of the controller 200.

The resistor 410 is connected in series with the Zener diode 408. A value of the resistor 410 can be selected based on a gain of the transistor 404. In some embodiments, the resistor 410 can help to manage the current flow through the Zener diode 408, ensuring that the Zener diode 408 operates within the specified parameters or operating conditions. The resistor 410 may also contribute to the overall stability and reliability of the illumination circuit 252.

The resistor 412 is connected in parallel with the transistor 414 and the resistor 410. The resistor 412 can dissipate leakage current that may pass through the Zener diode 408, impeding unintended turning on of the transistor 404. In the example of FIG. 4, the resistor 410 has a resistance of 10 kOhm, and the resistor 412 has a resistance of 47 kOhm.

As noted above, the transistor 414 is connected in series with the resistor 410 for connecting in parallel with the resistor 412. The transistor 414 can be used to further control the current flow within the circuit, advantageously providing constant current regulation through the LED 402. The transistor 414 may be implemented using various types of transistors (similar to the transistor 404), depending on the design and performance specifications of the illumination circuit 252.

Figure 5:
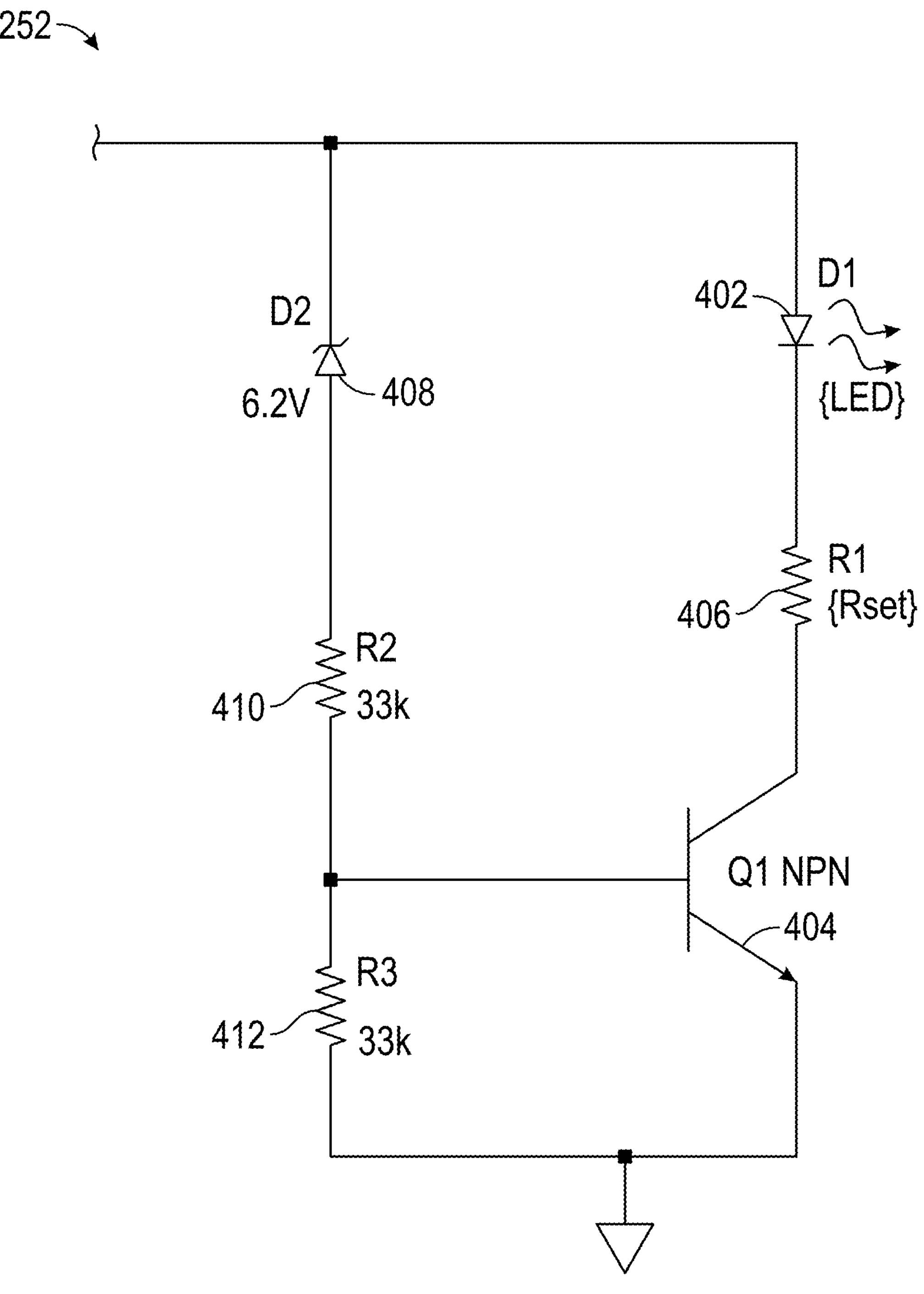
FIG. 5 is schematic circuit diagram of components of another example embodiment of an illumination circuit of FIG. 2 or 3.

FIG. 5 is another diagram of components of an example embodiment of an illumination circuit 252 of FIG. 2 or 3. The illumination circuit 252 can include fewer or more components than illustrated in FIG. 5. Unless otherwise noted, components of FIG. 5 can be structurally and/or functionally the same as or generally similar to like-named components of FIG. 4.

As shown in FIG. 5, the illumination circuit 252 includes a light emitting diode (LED) 402, a transistor 404, a resistor 406, a Zener diode 408, a resistor 410 and a resistor 412. Compared with FIG. 4, FIG. 5 shows that the illumination circuit 252 does not include the transistor 414 that is used to provide generally constant current regulation through the LED 402. As such, FIG. 5 may provide a lower cost implementation of the illumination circuit 252 compared with FIG. 4. The implementation of FIG. 5 can be useful in applications without generally constant current regulation.

Figure 6:
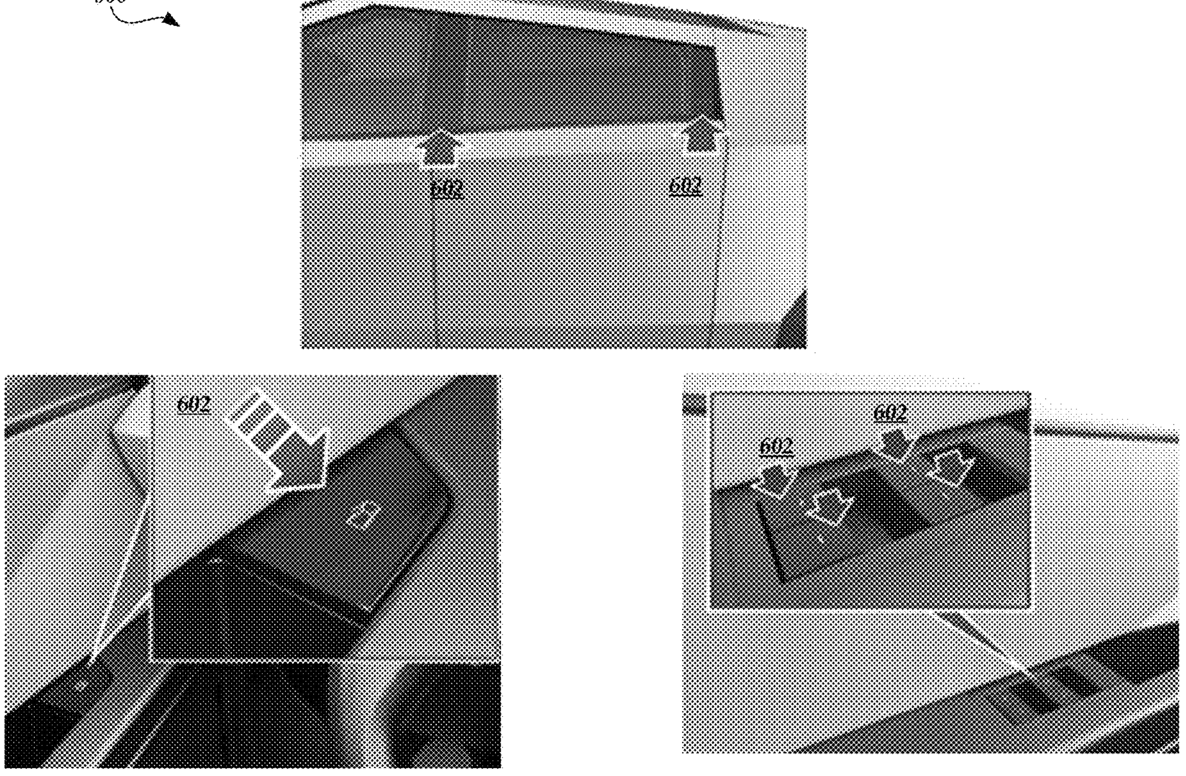
FIG. 6 shows portions of an example vehicle including example illuminated buttons according to some embodiments of the present disclosure.

FIG. 6 shows portions of an example vehicle 600 including illuminated button(s) 602 according to some embodiments of the present disclosure. As shown in FIG. 6, the illuminated buttons 602 can be deployed in exterior surfaces (e.g., around a window) and/or interior surfaces (e.g., around a door lock control) of the vehicle 600. In some embodiments, when a user presses the illuminated button 602, the switch 262 will change its switch state (e.g., change from open to close or from close to open).

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

It is to be understood that not necessarily all objects or advantages may be achieved in accordance with any particular example described herein. Thus, for example, those skilled in the art will recognize that some examples may be operated in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, some acts, events, or functions of any of the algorithms described herein can be performed in a different sequence, can be added, merged, or left out altogether (for example, not all described acts or events are necessary for the practice of the algorithms). Moreover, in some examples, acts or events can be performed concurrently, for example, through multi-threaded processing, interrupt processing, or multiple processors or processor cores, or on other parallel architectures, rather than sequentially. In addition, different tasks or processes can be performed by different machines and/or computing systems that can function together.

The various illustrative logical blocks and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combination of the same, or the like. A processor can include electrical circuitry to process computer-executable instructions. In some examples, a processor includes an FPGA or other programmable device that performs logic operations without processing computer-executable instructions. A processor can also be implemented as a combination of computing devices, for example, a combination of a DSP and a microprocessor, a plurality of microprocessors, microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Conditional language such as, among others, "can," "could," "might" or "may," unless specifically stated otherwise, are otherwise understood within the context as used in general to convey that some examples include, while other examples do not include, some features, elements and/or steps. Thus, such conditional language is not generally intended to imply that features, elements and/or steps are in any way for examples or that examples necessarily include logic for deciding, with or without user input or prompting, whether these features, elements and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that some examples require at least one of X, at least one of Y, or at least one of Z to each be present.

Any process descriptions, elements or blocks in the flow diagrams described herein and/or depicted in the attached figures should be understood as potentially representing modules, segments, or portions of code which include executable instructions for implementing specific logical functions or elements in the process. Alternate examples are included within the scope of the examples described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure.

Any process descriptions, elements or blocks in the flow diagrams described herein and/or depicted in the attached figures should be understood as potentially representing modules, segments, or portions of code which include executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. An illuminated interface system comprising:

an illumination circuit configured to illuminate a light source;

a switch circuit configurable into a plurality of states, wherein at least one of the plurality of states represents a user input; and a controller electrically connected to the illumination circuit and the switch circuit through a single signal wire, the controller comprising:

a drive circuit configured to provide a drive signal to the illumination circuit via the single signal wire; and a sensing circuit configured to detect a state of the switch circuit, wherein the drive circuit comprises a load switch configured to toggle between being open and closed, wherein the drive circuit provides the drive signal via the single signal wire when the load switch is closed, and wherein the sensing circuit is configured to detect the state of the switch circuit when the load switch is opened.

2. The illuminated interface system of claim 1, wherein the user input is a button push.

3. The illuminated interface system of claim 1, wherein illumination circuit is configured to not interfere with the sensing circuit detecting the state of the switch circuit when the load switch is open.

4. The illuminated interface system of claim 1, wherein the drive circuit is configured to provide the drive signal according to a pulse width modulation (PWM) signal.

5. The illuminated interface system of claim 4, wherein the PWM signal has a frequency not exceeding 250 Hertz, and wherein a duty cycle of the PWM signal is no more than 95%.

6. The illuminated interface system of claim 1, wherein the illumination circuit and the switch circuit are connected in parallel with each other.

7. The illuminated interface system of claim 1, wherein the sensing circuit comprises an analog-to-digital converter.

8. An illuminated interface system comprising:

an illumination circuit configured to illuminate a light source;

a switch circuit configurable into a plurality of states, wherein at least one of the plurality of states represents a user input; and a controller electrically connected to the illumination circuit and the switch circuit, the controller configured to cause the illumination circuit to illuminate a light source using a pulse width modulation signal, and the controller configured to detect a state of the switch circuit during an off state of the pulse width modulation signal, wherein the controller comprises a first power supply and a second power supply, wherein the first power supply is configured to supply power to the illumination circuit to illuminate the light source, and wherein the second power supply is configured to supply power to the switch circuit for detecting the state of the switch circuit.

9. The illuminated interface system of claim 8, wherein user input is a button push.

10. The illuminated interface system of claim 8, wherein the pulse width modulation signal has a frequency not exceeding 250 Hertz.

11. The illuminated interface system of claim 8, wherein a supply voltage of the first power supply is higher than a supply voltage of the second power supply.

12. The illuminated interface system of claim 8, wherein the controller comprises an analog-to-digital converter, and wherein the controller uses the analog-to-digital converter to detect the state of the switch circuit during an off state of the pulse width modulation signal.

13. The illuminated interface system of claim 8, wherein the switch circuit comprises a plurality of switches connected in parallel with each other.

14. The illuminated interface system of claim 8, wherein the illumination circuit comprises (i) a light emitting diode (LED) and (ii) a circuit configured to block a current through the LED during the off state of the pulse width modulation signal, and wherein the LED is the light source.

15. The illuminated interface system of claim 8, further comprising an electrostatic discharge protection circuit connected in parallel with the illumination circuit and the switch circuit.

16. A vehicle comprising:

a user interface;

an illumination circuit configured to provide illumination associated with the user interface;

a switch circuit configurable into a plurality of states, wherein at least one of the plurality of states represents a user input at the user interface; and a controller in communication with the illumination circuit and the switch circuit via a single signal wire, the controller comprising a processing circuit configured to drive the illumination circuit and sense a state of the switch circuit, wherein the processing circuit comprises a load switch configured to toggle between being open and closed, wherein the processing circuit provides a drive signal via the single signal wire to drive the illumination circuit when the load switch is closed, and wherein the processing circuit is configured to sense the state of the switch circuit when the load switch is opened.

17. The vehicle of claim 16, wherein the user interface is a button, and wherein the user input is a push of the button.

18. The vehicle of claim 16, wherein in response to the user input, the controller causes the illumination circuit to provide illumination associated with the user interface.

* * * * *